US012602281B2

(12) United States Patent
Zhang et al.

(10) Patent No.:  US 12,602,281 B2
(45) Date of Patent:       Apr. 14, 2026

(54) MEMORY SYSTEM GENERATING PARITY CHECK CODES USING A RANDOMIZER

(71) Applicant: Yangtze Memory Technologies Co., Ltd., Hubei (CN)

(72) Inventors: Zhe Zhang, Hubei (CN); Hua Tan, Hubei (CN); Xue Wu, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 13 days.

(21) Appl. No.: 18/667,767

(22) Filed: May 17, 2024

(65) Prior Publication Data

US 2025/0199904 A1        Jun. 19, 2025

Related U.S. Application Data

(63) Continuation of application No. PCT/CN2023/139730, filed on Dec. 19, 2023.

(51) Int. Cl.
*G06F 11/10*            (2006.01)
(52) U.S. Cl.
CPC ................................ *G06F 11/1004* (2013.01)
(58) Field of Classification Search
CPC .................................................. G06F 11/1004
See application file for complete search history.

(56) References Cited

U.S. PATENT DOCUMENTS

| | | | |
|---|---|---|---|
| 2007/0136647 A1 | 6/2007 | Kanai et al. | |
| 2007/0263861 A1* | 11/2007 | Kiyomoto | H04L 9/0668 |
| | | | 380/46 |
| 2012/0005409 A1* | 1/2012 | Yang | G06F 12/1408 |
| | | | 711/E12.008 |
| 2018/0276069 A1* | 9/2018 | Takayama | G06F 12/0246 |
| 2019/0018737 A1 | 1/2019 | Kim et al. | |

OTHER PUBLICATIONS

International Search Report issued on Aug. 23, 2024 in the International Application No. PCT/CN2023/139730, 3 pages.

* cited by examiner

*Primary Examiner* — Thien Nguyen
(74) *Attorney, Agent, or Firm* — Oblon, McClelland, Maier & Neustadt, L.L.P.

(57)        ABSTRACT

Aspects of the disclosure provide a memory system. For example, the memory system can include a memory device configured to store data and one or more parity check codes. The memory system can further include a randomizer configured to generate a sequence of pseudo-randomized numbers using a randomizer seed in response to a clock signal according to a predetermined rule. The memory system can further include a codec coupled to the memory device and the randomizer. The codec can be configured to generate the one or more parity check codes according to the pseudo-randomized numbers and the data. The parity check codes are to be written to the memory device when a write operation is performed and to be used to recover at least one of the data stored in the memory device when a read operation is performed and the at least one of the data is incorrect.

20 Claims, 12 Drawing Sheets

| generated element | polynomial | binary | decimal |
|---|---|---|---|
| 0 | 0 | 0000 | 0 |
| $X^0$ | $X^0$ | 0001 | 1 |
| $X^1$ | $X^1$ | 0010 | 2 |
| $X^2$ | $X^2$ | 0100 | 4 |
| $X^3$ | $X^3$ | 1000 | 8 |
| $X^4$ | $X^1+1$ | 0011 | 3 |
| $X^5$ | $X^2+X^1$ | 0110 | 6 |
| $X^6$ | $X^3+X^2$ | 1100 | 12 |
| $X^7$ | $X^3+X^1+1$ | 1011 | 11 |
| $X^8$ | $X^2+1$ | 0101 | 5 |
| $X^9$ | $X^3+X^1$ | 1010 | 10 |
| $X^{10}$ | $X^2+X^1+1$ | 0111 | 7 |
| $X^{11}$ | $X^3+X^2+X^1$ | 1110 | 14 |
| $X^{12}$ | $X^3+X^2+X^1+1$ | 1111 | 15 |
| $X^{13}$ | $X^3+X^2+1$ | 1101 | 13 |
| $X^{14}$ | $X^3+1$ | 1001 | 9 |
| $X^{15}$ | 1 | 0001 | 1 |

| CLK | FF0 | FF1 | FF2 | FF3 |
|---|---|---|---|---|
| seed | 1 | 0 | 0 | 1 |
| CLK | 0 | 0 | 0 | 1 |
| CLK | 0 | 0 | 1 | 1 |
| CLK | 0 | 1 | 0 | 0 |
| CLK | 1 | 0 | 0 | 0 |

| gflog(x) | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | - | 00 | 01 | 19 | 02 | 32 | 1a | c6 | 03 | df | 33 | ee | 1b | 68 | c7 | 4b |
| 1 | 04 | 64 | e0 | 0e | 34 | 8d | ef | 81 | 1c | c1 | 69 | f8 | c8 | 08 | 4c | 71 |
| 2 | 05 | 8a | 65 | 2f | e1 | 24 | 0f | 21 | 35 | 93 | 8e | da | f0 | 12 | 82 | 45 |
| 3 | 1d | b5 | c2 | 7d | 6a | 27 | f9 | b9 | c9 | 9a | 09 | 78 | 4d | e4 | 72 | a6 |

FIG. 6A

| gfilog(x) | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | 01 | 02 | 04 | 08 | 10 | 20 | 40 | 80 | 1d | 3a | 74 | e8 | cd | 87 | 13 | 26 |
| 1 | 4c | 98 | 2d | 5a | b4 | 75 | ea | c9 | 8f | 03 | 06 | 0c | 18 | 30 | 60 | c0 |
| 2 | 9d | 27 | 4e | 9c | 25 | 4a | 94 | 35 | 6a | d4 | b5 | 77 | ee | c1 | 9f | 23 |
| 3 | 46 | 8c | 05 | 0a | 14 | 28 | 50 | a0 | 5d | ba | 69 | d2 | b9 | 6f | de | a1 |

FIG. 6B

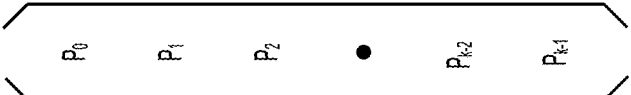

$$[P_0 \quad P_1 \quad P_2 \quad \bullet \quad P_{k-2} \quad P_{k-1}]$$

$$=$$

$$[D_0 \quad D_1 \quad D_2 \quad D_3 \quad \bullet \quad D_{n-2} \quad D_{n-1}]$$

$$\times$$

$$
\begin{bmatrix}
1 & GF(n-1) & GF(2(n-1)) & GF(3(n-1)) & \bullet & GF((k-2)(n-1)) & GF((k-1)(n-1)) \\
1 & GF(n-2) & GF(2(n-2)) & GF(3(n-2)) & \bullet & GF((k-2)(n-2)) & GF((k-1)(n-2)) \\
\bullet & \bullet & \bullet & \bullet & \bullet & \bullet & \bullet \\
\bullet & \bullet & \bullet & \bullet & \bullet & \bullet & \bullet \\
1 & GF(3) & GF(6) & GF(9) & \bullet & GF((k-2)3) & GF((k-1)3) \\
1 & GF(2) & GF(4) & GF(6) & \bullet & GF((k-2)2) & GF((k-1)2) \\
1 & GF(1) & GF(2) & GF(3) & \bullet & GF(k-2) & GF(k-1) \\
1 & 1 & 1 & 1 & \bullet & 1 & 1
\end{bmatrix}
$$

$$
\begin{bmatrix}
1 & GF(1) & GF(2) & GF(3) & \cdots & GF(k-2) & GF(k-1) \\
1 & GF(2) & GF(4) & GF(6) & \cdots & GF((k-2)2) & GF((k-1)2) \\
1 & GF(3) & GF(6) & GF(9) & \cdots & GF((k-2)3) & GF((k-1)3) \\
\bullet & \bullet & \bullet & \bullet & \bullet & \bullet & \bullet \\
\bullet & \bullet & \bullet & \bullet & \bullet & \bullet & \bullet \\
1 & GF(n-2) & GF(2(n-2)) & GF(3(n-2)) & \cdots & GF((k-2)(n-2)) & GF((k-1)(n-2)) \\
1 & GF(n-1) & GF(2(n-1)) & GF(3(n-1)) & \cdots & GF((k-2)(n-1)) & GF((k-1)(n-1))
\end{bmatrix}
$$

*FIG. 8A*

$$
\begin{bmatrix}
1 & (X^0)^1 & (X^0)^2 & (X^0)^3 & \cdots & (X^0)^{k-2} & (X^0)^{k-1} \\
1 & (X^1)^1 & (X^1)^2 & (X^1)^3 & \cdots & (X^1)^{k-2} & (X^1)^{k-1} \\
1 & (X^2)^1 & (X^2)^2 & (X^2)^3 & \cdots & (X^2)^{k-2} & (X^2)^{k-1} \\
1 & (X^3)^1 & (X^3)^2 & (X^3)^3 & \cdots & (X^3)^{k-2} & (X^3)^{k-1} \\
1 & (X^4)^1 & \bullet & \bullet & \cdots & \bullet & \bullet \\
\bullet & \bullet & \bullet & \bullet & \bullet & \bullet & \bullet \\
1 & (X^{n-2})^1 & (X^{n-2})^2 & (X^{n-2})^3 & \cdots & (X^{n-2})^{k-2} & (X^{n-2})^{k-1} \\
1 & (X^{n-1})^1 & (X^{n-1})^2 & (X^{n-1})^3 & \cdots & (X^{n-1})^{k-2} & (X^{n-1})^{k-1}
\end{bmatrix}
$$

FIG. 9A

$$[P_0 \quad P_1] = [D_0 \quad D_1 \quad D_2 \quad D_3 \quad D_4 \quad D_5] \times \begin{bmatrix} 1 & 1 \\ 1 & X^1 \\ 1 & X^2 \\ 1 & X^3 \\ 1 & X^4 \\ 1 & X^5 \end{bmatrix}$$

FIG. 9B

$$\begin{bmatrix} P_0+D_0+D_2+D_3+D_5 \\ P_1+D_0+D_2X^2+D_3X^3+D_5X^5 \end{bmatrix} = [D_1 \quad D_4] \times \begin{bmatrix} 1 & 1 \\ X^1 & X^4 \end{bmatrix}$$

FIG. 9C

$$\begin{bmatrix} P_0+D_0+D_2+D_3+D_5 \\ P_1+D_0+D_2X^2+D_3X^3+D_5X^5 \end{bmatrix} \times \begin{bmatrix} 1 & 1 \\ X^4 & X^1 \end{bmatrix} = [D_1 \quad D_4]$$

FIG. 9D

$$\begin{cases} D_1 = X^4(P_0+D_0+D_2+D_3+D_5) + (P_1+D_0+D_2X^2+D_3X^3+D_5X^5) \\ D_4 = X^1(P_0+D_0+D_2+D_3+D_5) + (P_1+D_0+D_2X^2+D_3X^3+D_5X^5) \end{cases}$$

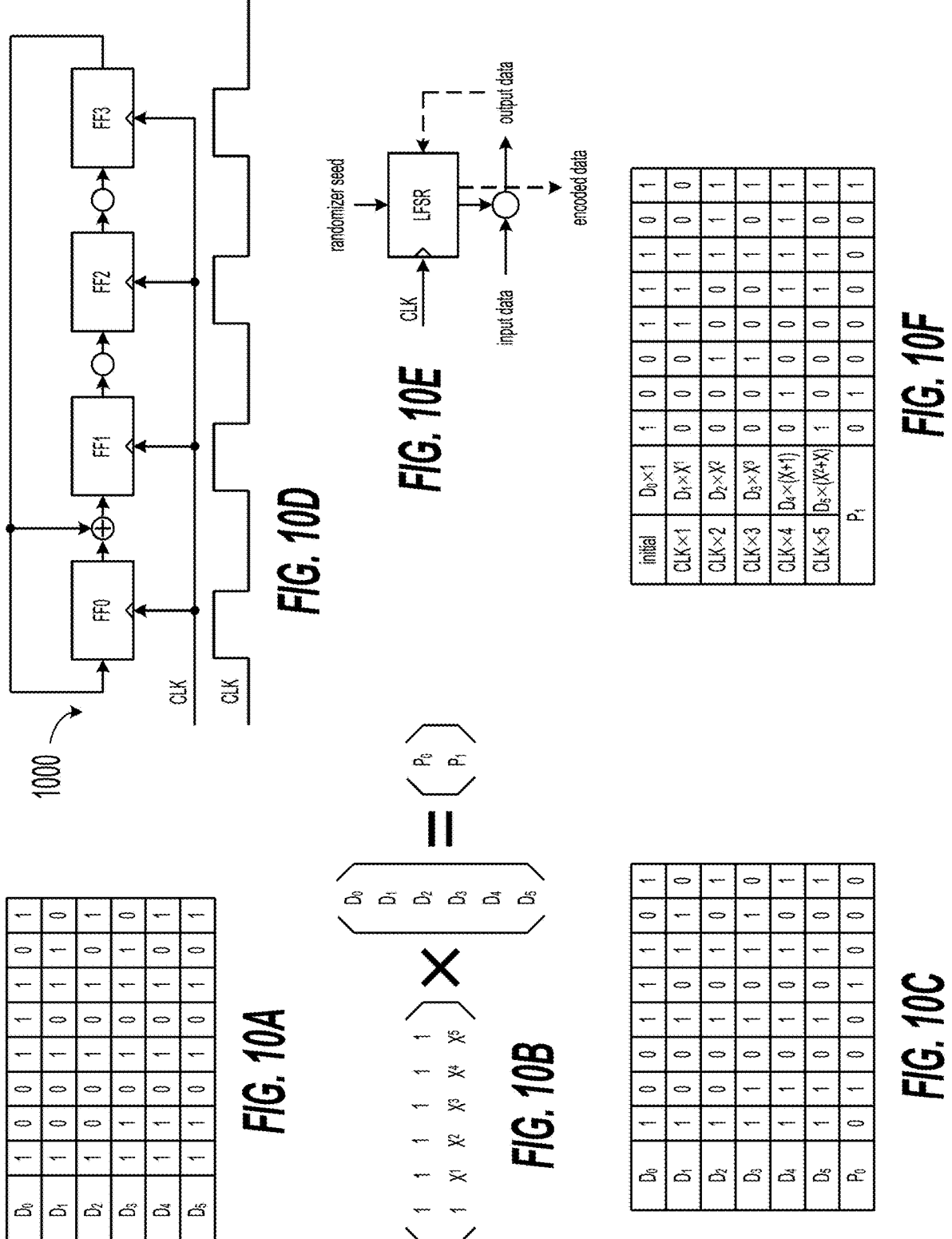

FIG. 11A

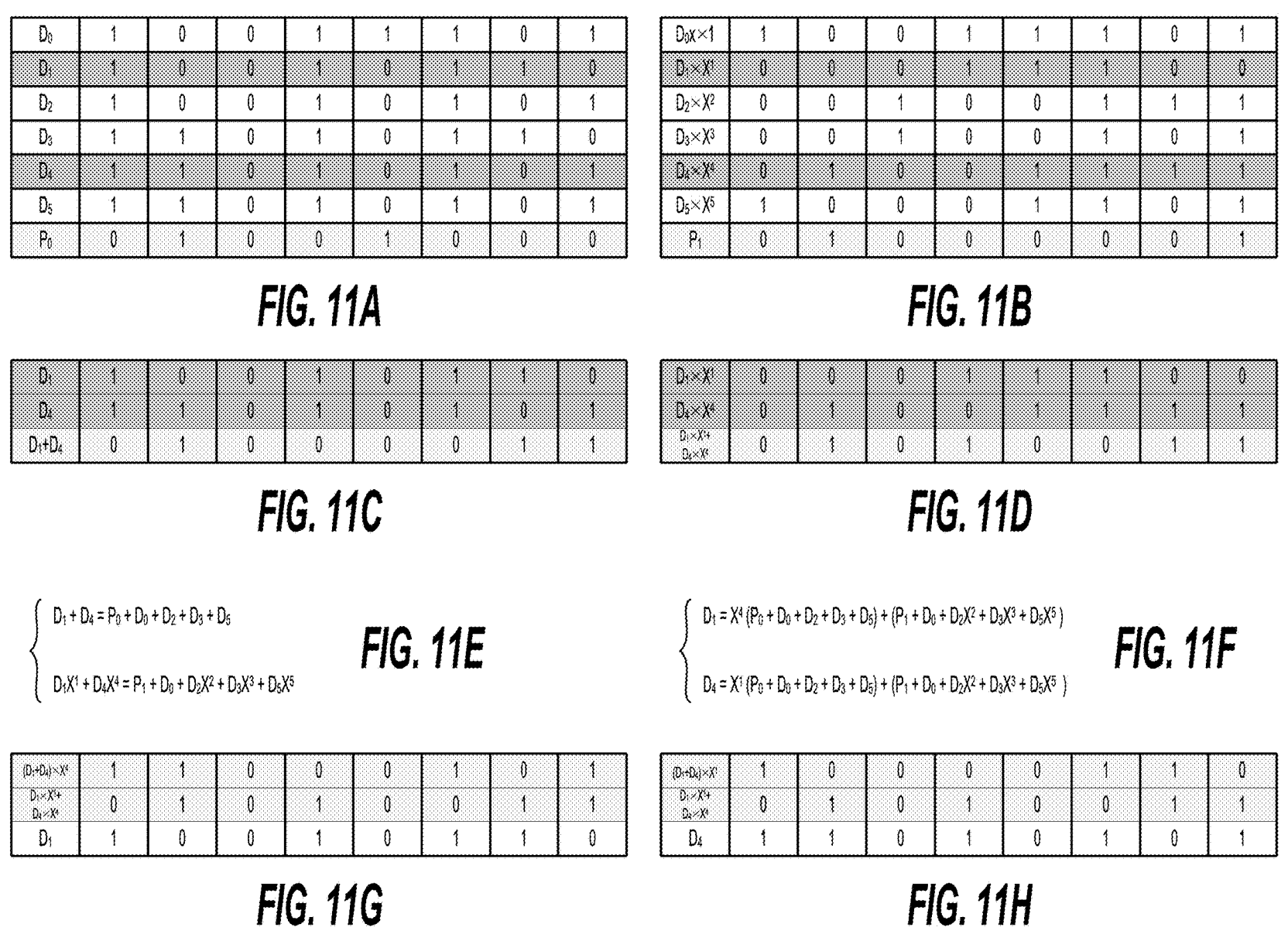

| $D_0$ | | | | | | | |
|---|---|---|---|---|---|---|---|
| $D_1$ | | | | | | | |
| $D_2$ | | | | | | | |
| $D_3$ | | | | | | | |
| $D_4$ | | | | | | | |
| $D_5$ | | | | | | | |
| $P_0$ | | | | | | | |

FIG. 11B

| $D_0 \times 1$ | | | | | | | |
|---|---|---|---|---|---|---|---|
| $D_1 \times X^1$ | | | | | | | |
| $D_2 \times X^2$ | | | | | | | |
| $D_3 \times X^3$ | | | | | | | |
| $D_4 \times X^4$ | | | | | | | |
| $D_5 \times X^5$ | | | | | | | |
| $P_1$ | | | | | | | |

FIG. 11C

| $D_1$ | | | |
|---|---|---|---|
| $D_4$ | | | |
| $D_1 + D_4$ | | | |

FIG. 11D

| $D_1 \times X^1$ | | | |
|---|---|---|---|
| $D_4 \times X^4$ | | | |
| $D_1 X^1 + D_4 X^4$ | | | |

| $(D_1 + D_4) \times X^1$ | | | |
|---|---|---|---|
| $D_1 \times X^1 +$ | | | |
| $D_4 \times X^4$ | | | |
| $D_1$ | | | |

FIG. 11H

| $(D_1 + D_4) \times X^4$ | | | |
|---|---|---|---|
| $D_1 \times X^1 +$ | | | |
| $D_4 \times X^4$ | | | |
| $D_4$ | | | |

MEMORY SYSTEM GENERATING PARITY CHECK CODES USING A RANDOMIZER

TECHNICAL FIELD

The present application describes implementations generally related to semiconductor memory devices.

BACKGROUND

As semiconductor devices, such as semiconductor memory devices, become more capable, one consistent trend is to increase the amount of data to be transferred per time period. For example, modern semiconductor memory devices can require data to be written thereto and read therefrom at high speed.

As critical dimensions of devices in integrated circuits shrink to the limits of common memory cell technologies, designers have been looking to techniques for stacking multiple planes of memory cells to achieve greater storage capacity, and to achieve lower costs per bit. A three-dimensional (3D) NAND memory device is an exemplary device of stacking multiple planes of memory cells to achieve greater storage capacity, and to achieve lower costs per bit. The 3D NAND memory device can include a stack of alternating insulating layers and word line layers over a substrate and a trench.

SUMMARY

Aspects of the disclosure provide a memory system. For example, the memory system can include a memory device configured to store data and one or more parity check codes. The memory system can further include a randomizer configured to generate a sequence of pseudo-randomized numbers using a randomizer seed in response to a clock signal according to a predetermined rule. The memory system can further include a codec coupled to the memory device and the randomizer. The codec can be configured to generate the one or more parity check codes according to the pseudo-randomized numbers and the data. The parity check codes can be written to the memory device when a write operation is performed and be used to recover at least one of the data stored in the memory device when a read operation is performed and the at least one of the data is incorrect.

In one implementation, the codec can be configured to generate the parity check codes by multiplying the pseudo-randomized numbers and the data and performing a bit-wise logic operation of multiplications of the pseudo-randomized numbers and the data. In another implementation, the codec can be configured to generate a number of the parity check codes, and the randomizer can be configured to generate the sequence of pseudo-randomized numbers using the randomizer seed in response to every the number of clocks of the clock signal according to the predetermined rule.

In one implementation, the randomizer seed can be selected based on the data and the pseudo-randomized numbers. In another implementation, the randomizer can include a linear feedback shift register (LFSR). For example, the LFSR can be specified by a primitive polynomial. In some implementations, the LSFR can include a first number of cascaded shift registers, the data include a second number of pages, the one or more parity check codes can include a third number of parity check codes, and two to a power of the first number can be greater than multiplication of the second number minus one and the third number minus one.

Aspects of the present disclosure also provide a method for controlling a memory system. For example, the method can include generating, by using a randomizer, a sequence of pseudo-randomized numbers using a randomizer seed in response to a clock signal according to a predetermined rule, receiving data to be stored in a memory device, generating one or more parity check codes according to the pseudo-randomized numbers and the data and writing the parity check codes and the data to the memory device when a write operation is performed, and recovering at least one of the data stored in the memory device using the one or more parity check codes when a read operation is performed and the at least one of the data stored in the memory device is incorrect.

Aspects of the present disclosure also provide a memory controller. For example, the memory controller can include a randomizer configured to generate a sequence of pseudo-randomized numbers using a randomizer seed in response to a clock signal according to a predetermined rule. The memory controller can further include a codec coupled to the randomizer. The codec can be configured to generate one or more parity check codes according to the pseudo-randomized numbers and data to be stored in a memory device. The parity check codes can be written to the memory device when a write operation is performed and be used to recover at least one of the data stored in the memory device when a read operation is performed and the at least one of the data is incorrect.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 6A and 6B list 64 elements in hex value of the gflog and gfilog tables, respectively.

FIG. 7 shows a polynomial matrix.

FIG. 8A shows a Vandermonde matrix has geometric series terms in each row.

FIG. 8B shows a Vandermonde matrix.

FIGS. 9A-9D illustrate encoding n blocks of data by using a polynomial matrix to generate parity check codes and recovering some of the data that are stored and affected to be incorrected.

FIGS. 10A-10F illustrate encoding n blocks of data by using a polynomial matrix that can be specified by a randomizer to generate parity check codes according to some implementations of the present disclosure.

FIGS. 11A-11H illustrate decoding (or recovering) some of the data $D_0$-$D_5$ that are affected to be incorrect by using the randomizer according to some implementations of the present disclosure.

DETAILED DESCRIPTION

Figure 1:
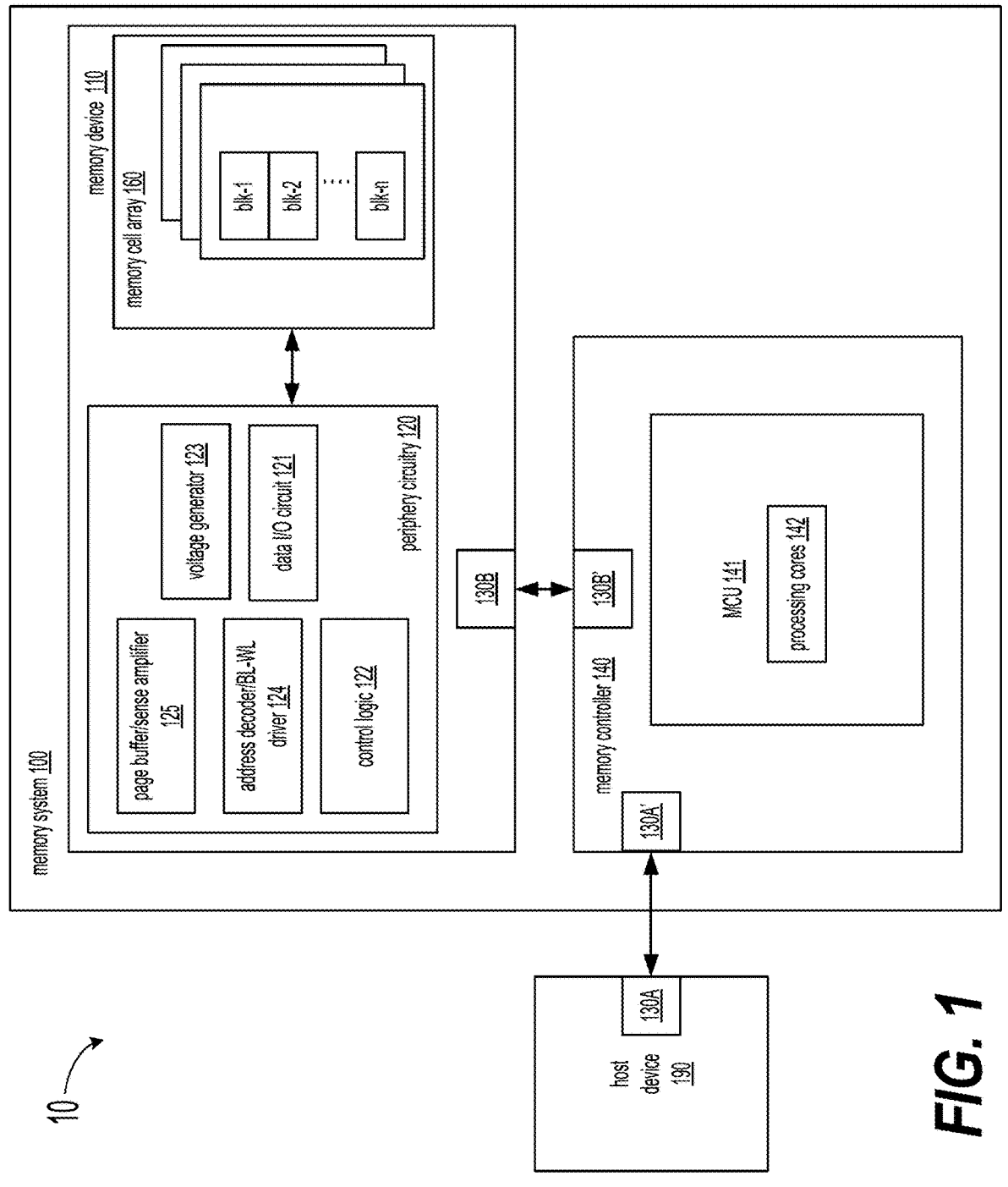
FIG. 1 is a functional block diagram of an example of a system according to some implementations of the present disclosure.

The following disclosure provides many different implementations, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include implementations in which the first and second features are formed in direct contact, and may also include implementations in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various implementations and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In modern storage systems, redundant array of independent disks (RAID) techniques are known as the preferable technique to achieve high performance and reliability. The most common RAID technique is RAID 5 (block-level striping with single distributed parity), which can tolerate one failure disk. RAID-6 (block-level striping with double distributed parity) can tolerate two failure disks and may have the best balance between storage efficiency and reliability.

FIG. 1 is a functional block diagram of an example of a system 10 according to some implementations of the present disclosure. In one implementation, the system 10 can include a memory system 100 and a host device 190. The system 10 can be included in an electronic device, such as a mobile phone, a virtual reality (VR), a gaming console, a wearable electronic device, a computer such as a desktop computer, a laptop computer, a tablet and a vehicle computer, or any other electronic devices. In some implementations, the host device 190 can be a processor of an electronic device in which the system 10 is included, such as a central processing unit (CPU), or a system-on-chip (SoC) such as an application processor (AP). The host device 190 can be configured to comply with the corresponding protocols (such as NVMe, PCIe, etc.). The host device 190 can be further configured to send data to and receive data from the memory system 100. In one implementation, the host device 190 can also send instructions to the memory system 100 besides the data.

Refer to FIG. 1. A memory controller 140 is coupled to the memory device 110 and the host device 190 via host interfaces 130A and 130A' and memory interfaces 130B and 130B', respectively, and is configured to control the memory device 110, according to some implementations. The memory controller 140 can be implemented by microprocessors, microcontrollers (a.k.a. microcontroller units (MCUs) that can include one or more processing cores, central process units (CPUs), digital signal processors (DSPs), application-specific integrated circuits (ASICs), field-programmable gate arrays (FPGAs), programmable logic devices (PLDs), state machines, gated logic, discrete hardware circuits or their combinations, and other suitable hardware, firmware, and/or software configured to perform the various functions described below in detail. For example, the memory controller 140 can include an MCU 141 that includes processing cores 142.

The memory controller 140 can manage the data stored in the memory device 110 and communicate with the host device 190. In some implementations, the memory controller 140 can be designed for operating in a low duty-cycle environment like secure digital (SD) cards, compact Flash (CF) cards, universal serial bus (USB) Flash drives, or other media for use in electronic devices such as personal computers, digital cameras, mobile phones, etc. In some implementations, the memory controller 140 can be designed for operating in a high duty-cycle environment SSDs or embedded multi-media-cards (eMMCs) used as data storage for mobile devices, such as smartphones, tablets, laptop computers, etc., and enterprise storage arrays. The memory controller 140 can be configured to control operations of memory device 110, such as read, erase, and program operations.

The memory controller 140 can communicate with an external device (e.g., the host device 190) according to a particular communication protocol. For example, the memory controller 140 may communicate with the external device through at least one of various interface protocols, such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

In some implementations, the memory controller 140 can receive from the host device 190 write commands (also referred to as program commands), read commands, erase commands and the like, and operate corresponding operations on the memory device 110 accordingly. For example, the memory controller 140 can receive from the host device 190 a write command with an address (ADDR) and data (DATA), and then perform a write operation by storing the data in the memory device 110 at the address. As another example, the memory controller 140 can receive from the host device 190 a read command with an address, and then perform a read operation by accessing the memory device 110 and outputting data stored at the address of the memory device 110. In various implementations, the memory controller 140 can receive from the host device 190 an erase command with an address, and then perform an erase operation by resetting one or more blocks of memory cells at the address to an un-programed state (also referred to as an erased state).

The memory controller 140 can also be configured to manage various functions with respect to the data stored or to be stored in the memory device 110 including, but not limited to bad-block management, garbage collection, logical-to-physical address conversion, wear leveling, etc. In some implementations, the memory controller 140 can be further configured to process error correction codes (ECCs) with respect to the data read from or written to memory device 110. Any other suitable functions may be performed by memory controller 140 as well, for example, formatting the memory device 110.

Figures 2A, 2B:
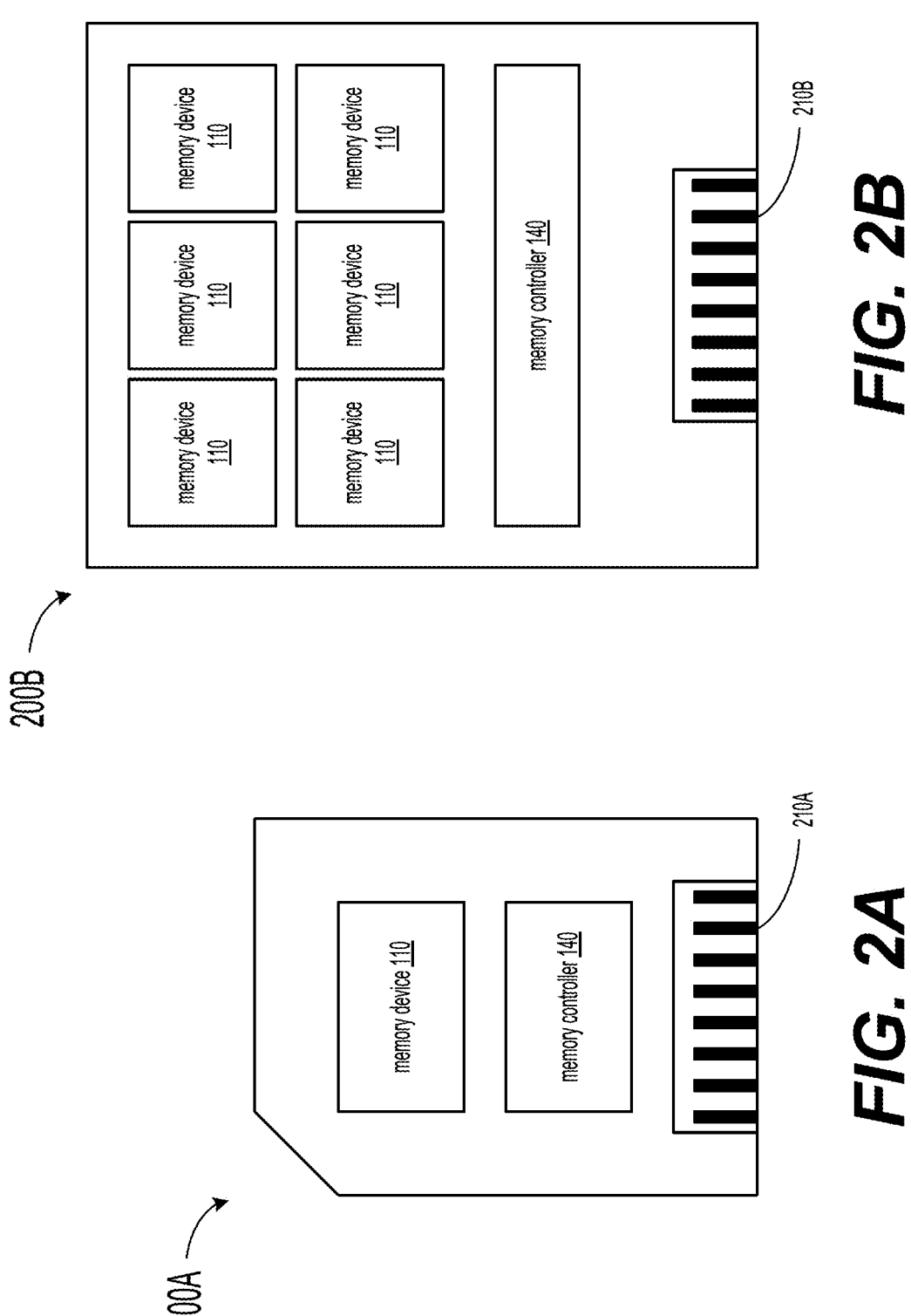
FIG. 2A is a schematic diagram of a memory controller and a memory device of the system that are integrated into a memory card.
FIG. 2B is a schematic diagram of the memory controller and more than one of the memory device of the system that are integrated into a memory card.

In some implementations, the memory device 110 and the memory controller 140 can be integrated into a variety of types of storage packages, such as a universal Flash storage (UFS) or an embedded multi-media-card (eMMC), and be included into a variety of types of electronic devices. For example, the memory controller 140 and one of the memory device 110 can be integrated into a memory card 200A, as shown in FIG. 2A. The memory card 200A can include a PC card (e.g., a personal computer memory card international association (PCMCIA)), a compact Flash (CF) card, a smart media (SM) card, a memory stick, a secure digital (SD) card (e.g., SD, miniSD, microSD and SD high capacity (SDHC)), a Universal Flash Storage (UFS), etc. The memory card 200A can further include a memory card connector 210A that is used to couple the memory card 200A to a host device, e.g., the host device 190 shown in FIG. 1. As another example, the memory controller 140 and more than one of the memory device 110, e.g., six memory devices 110, can be included in a solid state drive (SSD) 200B, as shown in FIG. 2B. The SSD 200B can also include an SSD connector 210B that is used to couple the SSD 200B to a host device, e.g., the host device 190 shown in FIG. 1.

In some implementations, the memory system 100 can include the memory controller 140 and the memory device 110. The memory device 110 can be any type of memory devices disclosed in the present disclosure, such as a NAND memory device. In one implementation, the memory device 110 can include a memory cell array 160 and a peripheral circuitry 120 coupled to the memory cell array 160. In some implementations, the memory cell array 160 and the peripheral circuitry 120 can be disposed on the same die (chip). In other implementations, the memory cell array 160 can be disposed on an array die, while the peripheral circuitry 120 can be disposed on a different die, such as a die that is implemented using complementary metal-oxide-semiconductor (CMOS) technology and is referred to as a CMOS die. The array die and the CMOS die can be suitably bonded and electrically coupled to each other. In some implementations, a CMOS die can be coupled to multiple array dies. In some implementations, an array die can be coupled to multiple CMOS dies. In one implementation, the memory device 110 can be an integrated circuit (IC) package that encapsulates one or more array dies and one or more CMOS dies.

Generally, the memory device 110 can include one or more memory cell arrays 160, and each of the memory cell arrays 160 can include a plurality of memory planes. Each of the plurality of memory planes can include a plurality of memory blocks, e.g., memory blocks blk-1 to blk-n. In some implementations, concurrent operations can take place at different memory planes. In one implementation, each of the memory blocks blk-1 to blk-n is the smallest unit to carry out an erase operation. Each of the memory blocks blk-1 to blk-n can include a number of pages. In some implementations, page is the smallest unit that can be programmed (i.e., written to) or read.

Figure 3:
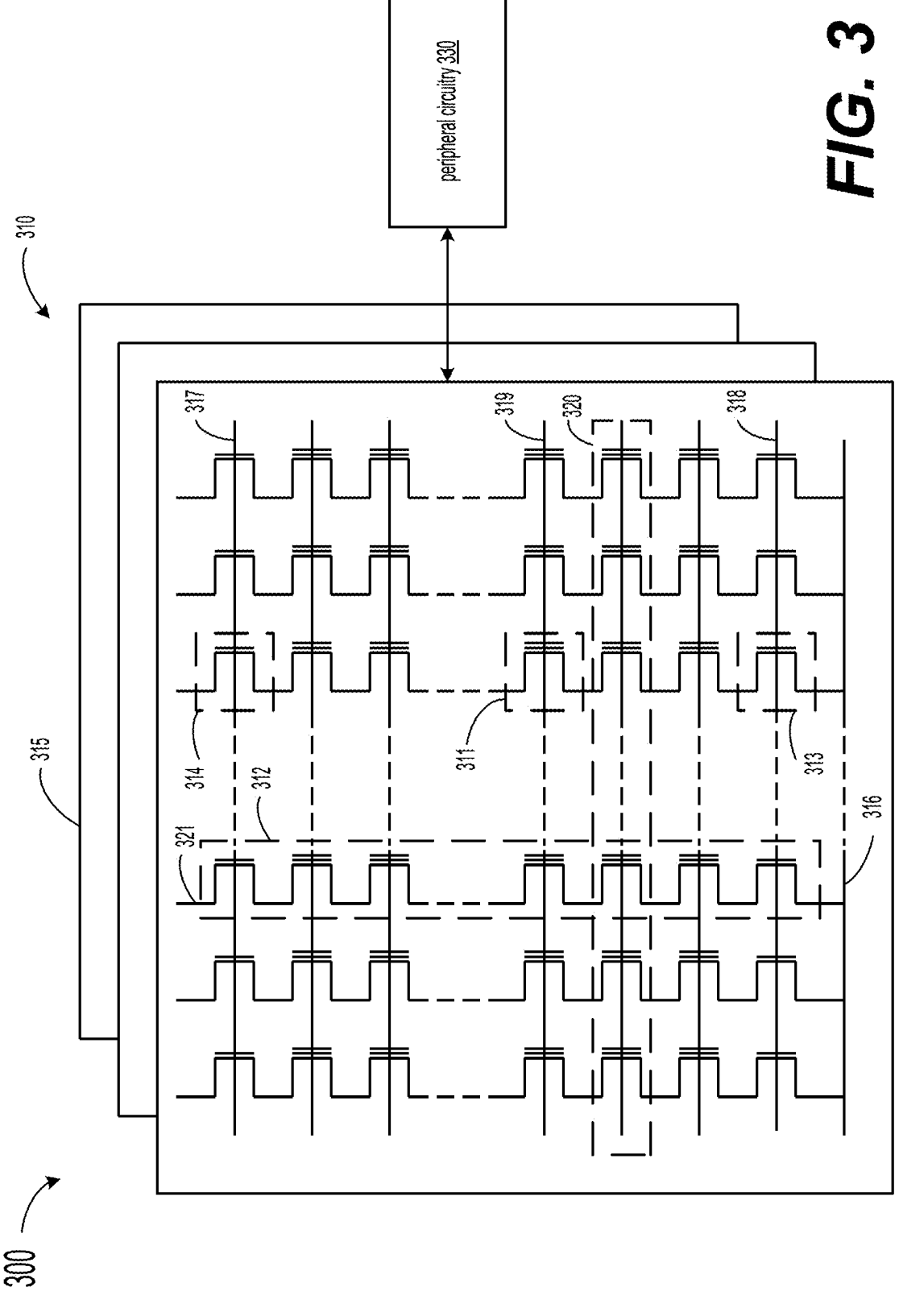
FIG. 3 is a schematic circuit diagram of an example of a memory device according to some implementations of the present disclosure.

FIG. 3 is a schematic circuit diagram of an example of a memory device 300, e.g., the memory device 110 shown in FIG. 1, according to some implementations of the present disclosure.

The memory device 300 can include a memory cell array 310, e.g., the memory cell array 160 shown in FIG. 1, and a peripheral circuitry 330, e.g., the peripheral circuitry 120 shown in FIG. 1. The memory cell array 310 can include one or more memory planes, and each of the memory planes can include a plurality of memory blocks 315, e.g., the memory blocks blk-1 to blk-n shown in FIG. 1. The memory cell array 310 can be a NAND memory cell array in which memory cells 311 are provided in the form of an array of NAND memory strings 312 each extending vertically above a substrate (not shown). In some implementations, each of the NAND memory strings 312 can include a plurality of the memory cells 311 coupled in series and stacked vertically over one another above the substrate. Each of the memory cells 311 can hold a continuous, analog value, such as an electrical voltage or charge, that depends on the number of electrons trapped within a region of the memory cell 311. Each of the memory cells 311 can be either a floating gate type of memory cell including a floating-gate transistor or a charge trap type of memory cell including a charge-trap transistor.

In some implementations, each of the memory cells 311 can be a single-level cell (SLC) that has two possible memory states, and thus can store one bit of data. For example, the first memory state "0" can correspond to a first range of voltages, and the second memory state "1" can correspond to a second range of voltages. In some implementations, each of the memory cells 311 can be a multi-level cell (MLC) that is capable of storing at least two bits of data in more than four memory states. For example, the MLC can store two bits per cell (also known as double-level cell (DLC)), three bits per cell (also known as triple-level cell (TLC)), or four bits per cell (also known as a quad-level cell (QLC)). Each MLC can be programmed to assume a range of possible nominal storage values. For example, a DLC can be programmed to assume one of three possible programming levels from an erased state by writing one of three possible nominal storage values to the memory cell. A fourth nominal storage value can be used for the erased state. In one implementation, an MLC can also be programmed to assume only one programming level from an erased state by writing a possible nominal storage value (e.g., a first nominal storage value) to the memory cell, and a second nominal storage value can be used for the erased state. For example, a TLC, though being capable of storing three bits, can be programmed to assume only one programming level from an erased state by writing a possible nominal storage value (e.g., a first nominal storage value) to the memory cell, and a second nominal storage value can be used for the erased state.

Each of the NAND memory strings 312 can include a source select gate (SSG) 313 at its source end and a drain select gate (DSG) 314 at its drain end. The SSGs 313 and the DSGs 314 can be configured to activate selected NAND memory strings 312 (i.e., columns of the memory cell array 310) during read and program operations. In some implementations, the sources of the NAND memory strings 312 in the same block 315 can be coupled through the same source line (SL) 316, e.g., a common SL. In other words, all of the NAND memory strings 312 in the same block 315 have an array common source (ACS), according to some implementations. In some implementations, the DSG 314 of each of the NAND memory strings 312 can be coupled to a respective bit line 321 from which data can be read from or written into the NAND memory string 312 via an output bus (not shown). In some implementations, each of the NAND memory strings 312 can be configured to be selected or deselected by applying a select voltage (e.g., above the threshold voltage of the transistor having the DSG 314) or a deselect voltage (e.g., 0 V) to respective DSG 314 through one or more DSG lines 317 and/or by applying a select voltage (e.g., above the threshold voltage of the transistor having the SSG 313) or a deselect voltage (e.g., 0 V) to respective SSG 313 through one or more SSG lines 318.

The NAND memory strings 312 can be organized into multiple blocks 315, each of which can have the common source line (SL) 316, e.g., coupled to the ACS. In some implementations, each of the blocks 315 is the basic data unit for erase operations, i.e., all of the memory cells 311 on the same block 315 shall be erased at the same time. To erase the memory cells 311 in a selected block 315, the source lines (SL) 316 coupled to the selected block 315 as well as unselected blocks 315 that are in the same plane as the selected block 315 can be biased with an erase voltage, such as a high positive voltage (e.g., 20 V or more). It is understood that in some implementations, an erase operation may be performed at a half-block level, a quarter-block level, or a level having any suitable number of blocks or any suitable fractions of a block. The memory cells 311 of adjacent NAND memory strings 312 can be coupled through word lines 319 that select which row of the memory cells 311 shall be affected by read and program operations. In some implementations, each of the word lines 319 can be coupled to a page 320 of the memory cells 311, which is the basic data unit for program operations. The size of one 319 in one block 315. For ease of description, the memory cells 311 in one page 320 may be coupled to the same word line 319, and the terms "page" and "word line" may be used interchangeably in the present disclosure. It is understood that, however, in some implementations, the memory cells 311 in one page 320 may be coupled to more than one word line 319. Each of the word lines 319 can include a plurality of control gates (or gate electrodes) (not shown) at each of the memory cells 311 in respective page 320 and a gate line (not shown) coupling the control gates.

Refer back to FIG. 1. In some implementations, the memory device 110 can include the peripheral circuitry 120, which can be coupled to the memory cell array 160 through the bit lines 321, the word lines 319, the source lines 316, the SSG lines 318, and the DSG lines 317. The peripheral circuitry 120 can include any suitable analog, digital, and mixed-signal circuits for facilitating the operations of the memory cell array 160 by applying and sensing voltage signals and/or current signals to and from each target (select) memory cell 311 through the bit lines 321, the word lines 319, the source lines 316, the SSG lines 318, and the DSG lines 317. The peripheral circuitry 120 can include various types of peripheral circuitry formed using metal-oxide-semiconductor (MOS) technologies. For example, as shown in FIG. 1, the peripheral circuitry 120 can include an I/O circuit 121, a control logic 122, a page buffer/sense amplifier 125, an address decoder/BL-WL driver 124 and a voltage generator 123. The control logic 122 can be coupled to each peripheral circuitry described above and configured to control the operations of each peripheral circuitry. It is understood that in some examples, additional peripheral circuitry not shown in FIG. 1 may be included as well.

In some implementations, the address decoder/BL-WL driver 124 can be coupled to the memory cell array 160. The address decoder/BL-WL driver 124 can include column decoder and row decoder. The column decoder can be connected to the memory cell array 160 via the bit lines 321 and may select bit lines based on column addresses. The column decoder can be configured to be controlled by the control logic 122 and select one or more of the NAND memory strings 312 by applying bit line voltages generated from the voltage generator 123. The row decoder may be connected to the memory cell array 160 via the word lines 319 and may select word lines based on row addresses. The row decoder can be configured to be controlled according to the control signals by the control logic 122 and select/unselect the memory blocks 315 of memory cell array 160 and select/unselect the word lines 319 of the memory block 315. The row decoder can be further configured to drive the word lines 319 using word line voltages generated from the voltage generator 123. In some implementations, the row decoder can also select/unselect and drive the SSG lines 318 and the DSG lines 317 as well using SSG voltages and DSG voltages generated from the voltage generator 123. In some implementations, during a write operation the address decoder/BL-WL driver 124 can provide word line (WL) signals and the select signals to the memory cell array 160 to select a page to program. During a read operation, the address decoder/BL-WL driver 124 can provide the WL signals and the select signals to select a page for buffering. During an erase operation, the address decoder/BL-WL driver 124 can provide the WL signals and the select signals to select a block to erase.

The page buffer/sense amplifier 125 can be coupled to the memory cell array 160 via the bit lines 321 and configured to read and program (write) data from and to memory cell array 160 according to the control signals from the control logic 122. The page buffer/sense amplifier 125 can be configured to buffer data, such as one or more pages of data during read and write operations. In one implementation, during a write operation (program operation) the page buffer/sense amplifier 125 can buffer data to be programed and drive the data to the bit lines 321 of the memory cell array 160 to write the data into the memory cell array 160. During the write operation, the page buffer/sense amplifier 125 can sense the signals (e.g., current) from the bit line 321 to verify whether the data has been properly programmed into target memory cells 311 coupled to the select word lines 319. In another implementation, during a read operation the page buffer/sense amplifier 125 can sense the low power signals (e.g., current) from the bit line 321 that represents a data bit stored in the memory cell 311 and amplify the small voltage swing to recognizable logic levels.

In the FIG. 1 example, in one implementation, the I/O circuit 121 is coupled to the control logic 122 and act as a control buffer to buffer and relay control commands (e.g., program command) received from the memory controller 140 to the control logic 122 and status information received from the control logic 122 to the memory controller 140. In another implementation, the I/O circuit 121 can also be coupled to the address decoder/BL-WL driver 124 and act as a data I/O interface and a data storage to buffer and relay the data to and from the memory cell array 160.

In some implementations, the memory system 100 may include the memory device 110, which may comprise an I/O circuit. The I/O circuit can be coupled to the external device, e.g., a host device such as the host device 190. The external device can implement the function of the memory controller described above. The external device can send commands to the memory device 110 via the I/O circuit. The external device can send data to and receive data from the memory device 110 via the I/O circuit. The external device can receive from the memory device 110 a signal generated by the memory device 110 in response to a command sent by the external device.

The voltage generator 123 can be configured to be controlled by the control logic 122 and configured to generate voltages of suitable levels for the proper operations of the memory device 110. For example, during a read operation the voltage generator 123 can generate voltages of suitable levels for source voltages, various word line (WL) voltages, select voltages and the like that are suitable for the read operation. In some implementations, during the read operation the source voltages can be provided as array common source (ACS) voltages to the source line 316. The WL voltages and the select voltages can be provided to the address decoder/BL-WL driver 124, and the address decoder/BL-WL driver 124 can thus output the WL signals and the select signals (e.g., TSG signals and BSG signals) at the suitable voltage level during the read operation.

In another implementation, during an erase operation the voltage generator 123 can generate voltages of suitable levels for source voltages, WL voltages, select voltages, BL voltages and the like that are suitable for the erase operation. In some implementations, during the erase operation the source voltage can be provided as ACS voltages to the source lines 316. The WL voltages and the select voltages can be provided to the address decoder/BL-WL driver 124, and the address decoder/BL-WL driver 124 can thus output the WL signals and the BSG and TSG signals at the suitable voltage level during the erase operation. The BL voltages can be provided to the page buffer/sense amplifier 125, and the page buffer/sense amplifier 125 can thus drive the bit lines (BL) at proper voltage level during the erase operation. In some implementation, the BL voltage may be applied directly to the bit lines, without going through the page buffer/sense amplifier 125.

Figure 4:
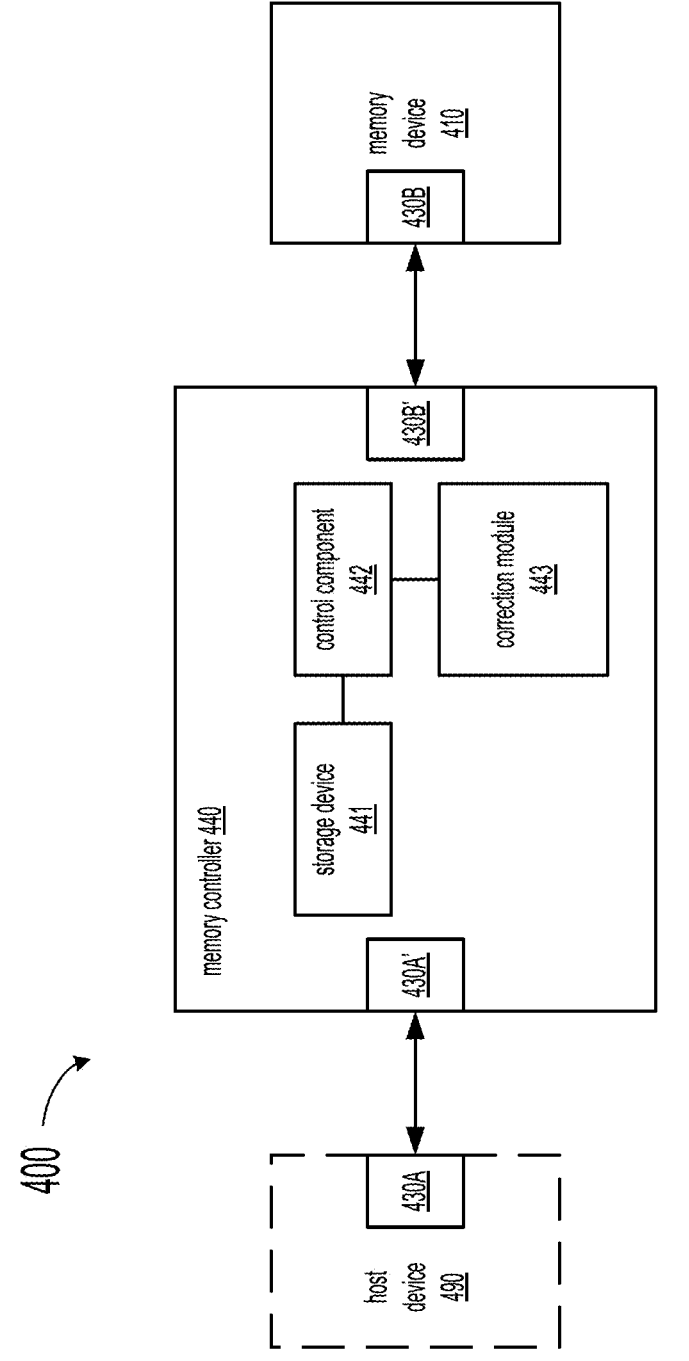
FIG. 4 is a functional block diagram of an example of a memory system according to some implementations of the present disclosure.

FIG. 4 is a functional block diagram of an example of a memory system 400 according to some implementations of the present disclosure. In one implementation, the memory system 400 can include a memory device 410 (e.g., the memory device 110 shown in FIG. 1) and a memory controller 440 (e.g., the memory controller 140 shown in FIG. 1) coupled to the memory device 410 via memory interfaces 430B and 430B' (e.g., the memory interfaces 130B and 130B' shown in FIG. 1). In one implementation, the memory controller 440 can be coupled to a host device 490 (e.g., the host device 190 shown in FIG. 1) via host interfaces 430A and 430A' (e.g., the host interfaces 130A and 130A' shown in FIG. 1).

In one implementation, the memory controller 440 can include a storage device 441, a control component 442 and a correction (e.g., an error correction code (ECC)) component 443. The control component 442 can be implemented as a processor such as a central processing unit (CPU). The storage device 441 may act as a working memory of the memory system 400 and store data for driving the memory system 400. For example, when the memory controller 440 controls operations of the memory device 410, such as read, write, program and erase operations, the storage device 441 may store data used by the memory controller 440 for the operations. The storage device 441 may be implemented with a volatile memory such as a dynamic random access memory (DRAM) or a static random access memory (SRAM). To store the data for read, write, program and erase operations, the storage device 441 may include a program memory, a data memory, a write buffer, a read buffer, a map buffer, and the like.

The control component 442 can be configured to control a read operation or a write operation, for example, for the memory device 410 in response to a read command or a write command from the host device 490, respectively.

The correction module 443 can be configured to detect and correct errors in the data read from the memory device 410 during the read operation by using error correction codes (ECCs). The correction module 443 may not correct error bits when the number of the error bits exceeds the ECC correction capability of the memory device 410, and the read operation using a set read threshold voltage fails. When the read operation using the set read threshold voltage fails, the control component 442 may perform an error recovery algorithm. For example, the control component 442 may perform one or more read-retry operations for the memory cells of the memory device 410 where the data are stored, until it is determined that decoding associated with a corresponding read retry operation is successful. As another example, when all read-retry operations fail, the control component 442 may perform additional recovery operations, which may include an optimal read threshold voltage search, a soft decoding using an ECC, and a redundant array of independent disks (RAID) recovery.

The correction module 443 may include an encoder and a decoder. In one implementation, the encoder (or a codec) can encode data of a predetermined size written onto the same page, so as to generate parity check codes. The parity check codes can be written onto a page onto which the data becoming a programming basis have been written. In some implementations, the decoder can decode and recover the data using the parity check codes.

Figures 5A, 5B, 5C:
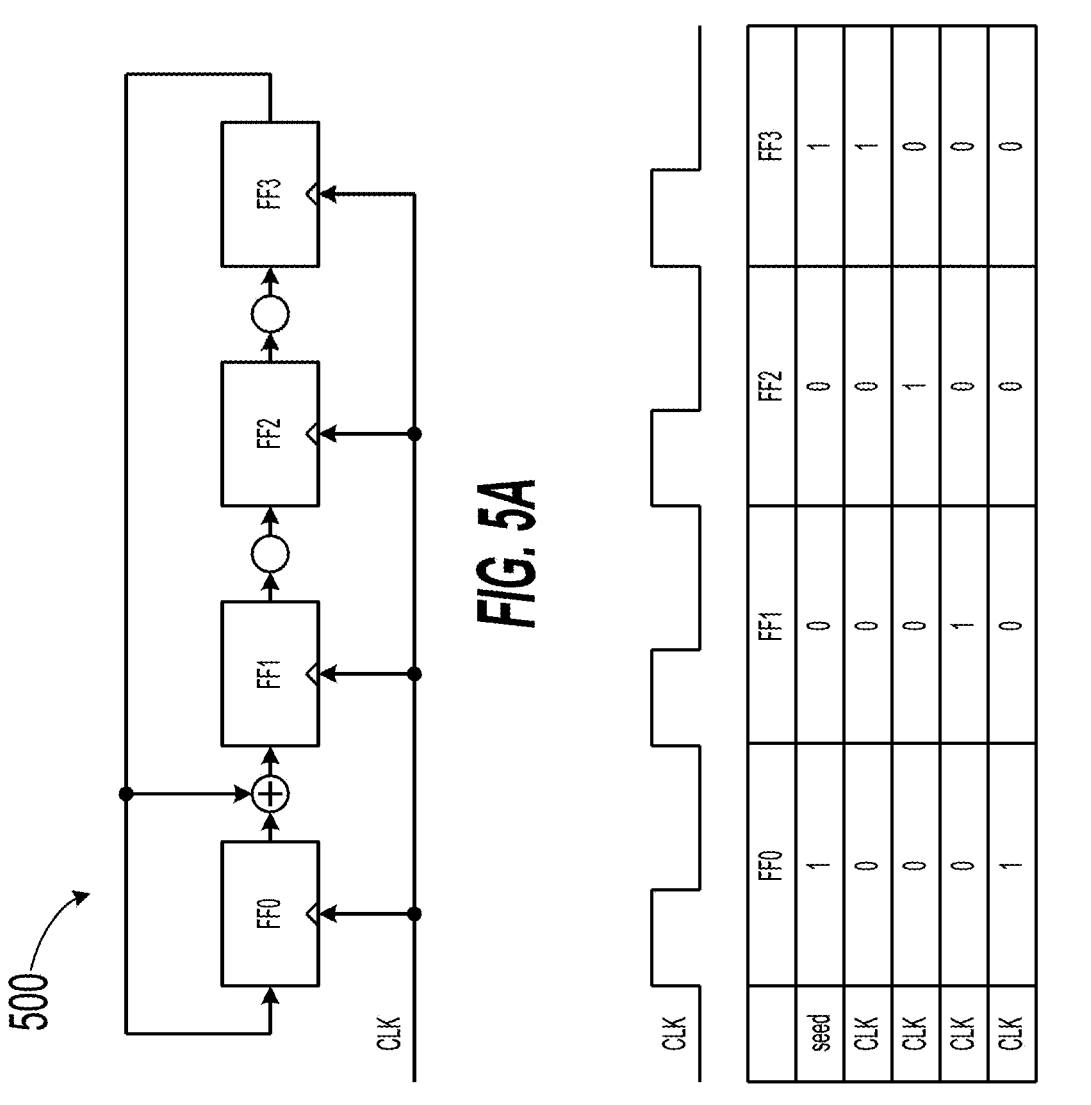
FIG. 5A is a circuit diagram of an example of a 4-bit linear feedback shift register (LFSR) according to some implementations of the present disclosure.
FIG. 5B illustrates the operation of the LFSR.
FIG. 5C lists the pseudo-random numbers generated by the LFSR.

FIG. 5A is a circuit diagram of an example of a 4-bit linear feedback shift register (LFSR) 500 according to some implementations of the present disclosure. The LFSR 500 includes a plurality of shift registers, e.g., flip-flops (FFs) FF0-FF3, and a feedback network consisting of exclusive OR (XOR) gate (denoted by symbol $\oplus$)), and the outputs of the FFs of some of the shift registers FF0-FF3 (also called taps) are fed as input to the XOR gate $\oplus$. The LFSR 500 is specified by its polynomial. For example, a $4^{th}$-degree polynomial with every term present is represented with the equation $x^4+x^3+x^2+x+1$. There are $2^{(4-1)}=8$ different possible polynomials of this size (i.e., 4), some of which are primitive polynomials. An LFSR, e.g., the LFSR 500, if specified by a primitive polynomial, can generate a maximum number of pseudo-random numbers specified within a finite field, e.g., Galois field $(GF(2^4))$. A finite field has an important property that arithmetic operations, such as add, subtract, multiple and divide, on field elements always have a result that is also in the finite field.

As shown in FIG. 5A, the LFSR 500 is specified by a primitive polynomial $q(x)=x^4+x+1$, and can generate $2^4-1=15$ pseudo-random numbers, as shown in FIG. 5C. Therefore, the LFSR 500 can be implemented as a randomizer. In a finite field, addition is defined to be a bit-wise XOR of the coefficients of the polynomial, and multiplication corresponds to multiplication of polynomials of a primitive element, e.g., x. In operation, as shown in FIG. 5B, a binary randomizer seed (e.g., "1001", as shown in FIG. 5C) can be input to the randomizer 500 initially, and one subsequent field element can be enumerated every clock by multiplying its previous field element by the primitive element, i.e., x, and taking the result module q(x) if it has degree greater than or equal to 4. For example, $x^2$ ("0100") can be multiplied by x to obtain $x^3$ ("1000"), $x^3$ ("1000") can be multiplied by x to obtain x+1 (which is $x^4$ module q(x)=$x^4$+x+1), $x^3$+x ("1010") can be multiplied by x to obtain $x^2$+x+1 (which is $x^4$+$x^2$ module q(x)=$x^4$+x+1), and so on. In some implementations, another randomizer, e.g., an LFSR, can include any number (e.g., n) of shift registers, and one subsequent field element can be enumerated every two, three or any number less than n.

Because an element in a GF, e.g., GF($2^n$), is enumerated by taking powers of a primitive element, e.g., x, the $i^{th}$ element can be represented by $x^i$. Likewise, the $j^{th}$ element in GF($2^n$) can be represented by $x^j$. Multiplication of the $i^{th}$ element by the $j^{th}$ element can be achieved by addition of their respective exponents, that is $x^i x x^j = x^{i+j}$, which is the $(i+j)^{th}$ element in GF($2^n$) if i+j<$2^n$-1 or is the $(i+j-255)^{th}$ element in GF($2^n$) if i+j>$2^n$-1. Since $x^i$ is the $i^{th}$ element in GF($2^n$), i=$\log_x x^i$. If the values of GF($2^n$) are enumerated as an indexed list, the index of the value is the log of the value. By swapping the columns and sorting in order of the values, $x^i$, a log table, i.e., gflog, can be created to look up the log of any value. Therefore, multiplication in GF($2^n$) is simply looking up the log values of the multiplicands, adding the log values (module $2^n$-1), and looking up an inverse log table (i.e., gfilog) of the addition.

FIGS. 6A and 6B list 64 elements in hex value of the gflog and gfilog tables, respectively, to demonstrate the multiplication and division examples of elements in a finite field. The value of x is represented in rows and columns so that the function result (in hex) can be found by looking in the cell with row R and column C. In one implementation, gflog [0×13] is found in the cell with row-1 and column-3 of the gflog table which gives a value of 0×0e. In another implementation, gfilog [0×0e] is found by looking in the gfilog table in row-0 and column-e which gives the value of 0×13. For example, the multiplication of 2 and 8=gfilog [gflog [2]+gflog [8]])=gfilog [1+3]=gfilog [4]=0×10. As another example, the multiplication of 0×12 and 5=gfilog [gflog [0×12]+gflog [5]]=gfilog [0xe0+0×32]=gfilog [0×13]=0×5e.

In one implementation, n(e.g., $2^{16}$) blocks of data, e.g., $D_0$ to $D_{n-1}$ (e.g., $D_2^{16}$-1) are to be encoded and stored, at most k blocks of the data can be corrected (or k parity check codes, e.g., $P_0$ to $P_{k-1}$ can be generated), and different elements in GF($2^m$) can be selected as coefficients of a polynomial matrix, e.g., a Vandermonde matrix, which has a full rank, is revertible and has k rows and n columns, as shown in FIG. 7. Each of the n blocks of data $D_0$ to $D_{n-1}$ can include data stored in a memory unit or data to be written onto a page. The data $D_0$ to $D_{n-1}$ forms a column vector or a matrix having only one column that has n(e.g., $2^{16}$) rows. The polynomial matrix has n(e.g., $2^{16}$) columns and k rows. Each of the rows represents a correction encoding polynomial that has n(e.g., $2^{16}$) polynomial coefficients, a number of which is equal to a number (i.e., n) of the data $D_0$ to $D_{n-1}$. The number (e.g., k) of the rows of the polynomial matrix, i.e., the number of the correction encoding polynomials, is equal to a number of the parity check codes, e.g., $P_0$ to $P_{k-1}$.

In one implementation, the polynomial matrix is a linearly independent matrix, and, when at most k of the data $D_0$-$D_{n-1}$ are affected to be incorrect, corresponding k of the parity check codes $P_0$-$P_{k-1}$ can be used to recover and correct the incorrect data. For example, in the polynomial matrix 1 and (n-1) successive non-zero elements that follows with indexes in multiples of 0 (i.e., the first row) of the Vandermonde matrix (i.e., 1, 1, . . . , 1 can be selected and be multiplied by the data Do to $D_{n-1}$ (i.e., XOR operation on the data $D_0$ to $D_{n-1}$ (similar to RAID 5 operation)) to generate the parity check code $P_0$, 1 and (n-1) successive non-zero elements that follow with indexes in multiples of 1 (i.e., the second row) of the Vandermonde matrix (i.e., 1, GF(1), GF(2), . . . , GF(n-1)) can be selected and be multiplied by the data $D_0$ to $D_{n-1}$ to generate the parity check code $P_1$ (similar to RAID 6 operation), 1 and (n-1) successive non-zero elements that follows with indexes in multiples of 2 (i.e., the third row) of the Vandermonde matrix (i.e., 1, GF(2×1), GF(2×2), . . . , GF(2x(n-1))) can be selected and be multiplied by the data $D_0$ to $D_{n-1}$ to generate the parity check code $P_2$, 1 and (n-1) successive non-zero elements that follows with indexes in multiples of 3 (i.e., the fourth row) of the Vandermonde matrix (i.e., 1, GF(3×1), GF(3×2), . . . , GF(3x(n-1))) can be selected and be multiplied by the data $D_0$ to $D_{n-1}$ to generate the parity check code $P_3$, . . . , and 1 and (n-1) successive non-zero elements that follows with indexes in multiples of (k-1) (i.e., the $(k)^{th}$ row) of the Vandermonde matrix (i.e., 1, GF((k-1)×1), GF((k-1)×2), . . . , GF((k-1)×(n-1))) can be selected and be multiplied by the data $D_0$ to $D_{n-1}$ to generate the parity check code $P_3$, in which (n-1)×(k-1)≤$2^m$-1.

In RAID decoding to recover incorrect data, the corresponding parity check codes are multiplied by an inverse of the polynomial matrix to obtain the correct data that are recovered from the incorrect data. In an alternative implementation, a reduce polynomial matrix can be formed that includes the rows of the polynomial matrix that correspond to the incorrect data, and an inverse of the reduced polynomial matrix can then be calculated and multiplied by corresponding parity check codes to recover the incorrect data.

In one implementation, if a NAND memory is provided that has 4 dies each having 4 planes each having 128 layers (6 strings) with two neighboring strings coupled to different word lines (WL) as a group, each group having 128 (WL) $x^2$ (string)×4 (plane)×4 (die)=4096 ($2^{12}$) elements (page), SLCs being 3 in groups, TLCs being 9 in groups, and four errors are to be corrected, n=4096, k=4, (n-1)×(k-1)=4095× 3<$2^{16}$-1, and GF($2^{16}$) can be selected. In another implementation, the LSFR can include a first number of cascaded shift registers, the data can include a second number of pages, the one or more parity check codes can include a third number of parity check codes, and two to a power of the first number can be greater than multiplication of the second number minus one and the third number minus one.

In linear algebra, a Vandermonde matrix has geometric series terms in each row, as shown in FIG. 8A. A Vandermonde matrix has full rank and is invertible. A square matric that has m rows that are selected from a Vandermonde matrix is also invertible. In one implementation, each row of the Vandermonde matrix is mapped to an index term. For example, the first row of the Vandermonde matrix can correspond to index of 0, the second row of the Vandermonde matrix can correspond to index of 1, the third row of the Vandermonde matrix can correspond to index of 2, . . . , and the kth row of the Vandermonde matrix can correspond to index of k-1. In one implementation, the field elements in the second row of the Vandermonde matrix can be enumerated every two clocks input to a randomizer (e.g., an LFSR including n shift registers), the field elements in the third row of the Vandermonde matrix can be enumerated every three clocks input to the randomizer, . . . , and the field elements in the kth row of the Vandermonde matrix can be enumerated every k clocks input to the randomizer.

The Vandermonde matrix can also be applied to a polynomial matrix, which has polynomial coefficients correspond to the terms of the Vandermonde matrix, for example, GF(1) corresponding to $x^1$, GF(2) corresponding to $x^2$, ..., and GF((k−1) (n−1)) corresponding to x(n−1) (k−1), as shown in FIG. 8B. In some implementations, an encoding matric can be formed by adding a unit (or an identity) matrix (in which all the diagonal elements are equal to 1 and all the other elements are equal to 0) on the basis of a polynomial matrix. The unit matrix has the same number of columns as the polynomial matrix. Therefore, the result obtained from the multiplication of the encoding matrix and the data vector not only include the parity check codes, but also the data $D_0$-$D_{n-1}$, which can be stored as a whole, so as to avoid loss of the data.

FIGS. 9A-9D illustrate encoding n blocks of data, e.g., $D_0$ to $D_5$, by using a polynomial matrix, to generate parity check codes, e.g., $P_0$ and $P_1$, and recovering some (e.g., two) of the data that are stored and affected to be incorrected, e.g., $D_1$ and $D_4$. In the example shown in FIGS. 9A-9D, a randomizer that is implemented by an LFSR, e.g., the randomizer 500, that is specified by a primitive polynomial $x^4$+x+1, can be used to generate the polynomial matrix.

As shown in FIG. 9A, the first and second rows of a Vandermonde matrix, i.e., (1, 1, 1, 1, 1, 1) and (1, $x^1$, $x^2$, $x^3$, $x^4$, $x^5$) can be selected and multiplied by the data $D_0$ to $D^5$ to generate parity check codes $P_0$ and $P_1$, which are equal to $(D_0+D_1+D_2+D_3+D_4+D_5)$ and $(D^0+D_1Xx+D_2xx^2+D_3xx^3+D_4xx^4+D_5xx^5)$, respectively. As shown in FIG. 9B, a reduced polynomial matrix can be formed to include the second and fifth columns of the first and second rows of the polynomial (Vandermonde) matrix and be multiplied by the data $D_1$ and $D_4$ to generate $(P_0+D_0+D_2+D_3+D_5)$ and $(P_1+D_0+D_2xx^2+D_3xx^3+D^5xx^5)$, respectively. As shown in FIG. 9C, the inverse matrix of the reduced polynomial matrix is calculated and the data $D_1$ and $D_4$ can be equal to the inverse matric multiplied by $(P_0+D_0+D_2+D_3+D_5)$ and $(P_1+D_0+D_2xx^2+D_3xx^3+D^5xx^5)$, respectively. Therefore, the data $D_1$ is equal to $x^4x$ $(P_0+D_0+D_2+D_3+D_5)$+ $(P_1+D_0+D_2xx^2+D_3xx^3+D^5xx^5)$, and the data $D_4$ is equal to $x^1x(P_0+D_0+D_2+D_3+D_5)$+ $(P_1+D_0+D_2xx^2+D_3xx^3+D^5xx^5)$, as shown in FIG. 9D. Accordingly, the data $D_1$ and $D_4$ that are incorrect can be recovered and corrected using the randomizer 500. The term "x'" indicates the number of clocks that have been input to the randomizer 500 since the data are input to the randomizer 500. For example, "$x^4$" indicates that four clocks have been input to the randomizer 500 since the data are input to the randomizer 500.

FIGS. 10A-10F illustrate encoding n blocks of data by using a polynomial matrix that can be specified by a randomizer to generate parity check codes according to some implementations of the present disclosure. As shown in FIG. 10A, six blocks of data, e.g., $D_0$-$D_5$, are to be stored in a memory device, e.g., the memory device 110 shown in FIG. 1. For example, $D_0$ is "10011101", $D_1$ is "10010110", $D_2$ is "10010101", $D_3$ is "11010110", $D_4$ is "11010101", and $D_5$ is "11010101". Before stored in the memory device 110, parity check codes are to be generated, in order for some of the data $D_0$-$D_5$, if affected to be incorrect, to be recovered by the parity check codes.

As shown in FIG. 10B, a polynomial (Vandermonde) matrix is selected that is specified by a primitive polynomial, e.g., $q(x)=x^4$+x+1. In the example implementation shown in FIG. 10B, two parity check codes, e.g., $P_0$ and $P_1$, are to be generated, and, accordingly, the first row (i.e., [1, 1, 1, 1, 1, 1]) and the second row (i.e., [1, $x^1$, $x^2$, $x^3$, $x^4$, $x^5$]) of the polynomial matrix can be selected and be multiplied by the data $D_0$-$D^5$ to generate the parity check codes $P_0$ and $P_1$. In some implementations, k parity check codes are to be generated, and, accordingly, the first row, the second row, . . . , and the $(k-1)^{th}$ row (i.e., [1, $x^1$ (k−1), $x^2$ (k−1), $x^3$ (k−1), $x^4$ (k−1), $x^5$ (k−1)]) of the Vandermonde matrix can be selected and be multiplied by the data $D_0$-$D^5$ to generate the parity check codes $P_0$, $P_1$, . . . , and $P_{k-1}$, in order for k of the data $D_0$-$D_5$, if affected to be incorrect, to be recovered by the parity check codes $P_0$-$P_{k-1}$.

As shown in FIG. 10C, the parity check code $P_0$ is generated. For example, the parity check code $P_0$ can be generated by bit-wise XOR of the data $D_0$-$D_5$ to obtain "01001000". As shown in FIG. 10D, a randomizer 1000, e.g., an LFSR (e.g., the LFSR 500), can be used to implement the primitive polynomial $q(x)=x^4$+x+1. FIG. 10E shows the simplified circuit diagram of the randomizer 1000. In the example implementation shown in FIG. 10B, one subsequent field element can be enumerated every clock by using the randomizer 1000. For example, initially the data Do is multiplied by 1; after one clock, the data $D_1$ is multiplied by x output from the randomizer 1000 (i.e., Dix); after two clocks, the data $D_2$ is multiplied by $x^2$ (i.e., x shifted rightward by one bit) output from the randomizer 1000 (i.e., $D_2x^2$); after three clocks, the data $D_3$ is multiplied by $x^3$ (i.e., $x^2$ shifted rightward by one bit) output from the randomizer 1000 (i.e., $D_3x^3$); after four clocks, the data $D_4$ is multiplied by x+1 (i.e., $x^4$ module ($x^4$+x+1)) (i.e., $x^3$ shifted rightward by one bit) output from the randomizer 1000 (i.e., $D_4$ (x+1)); after five clocks, the data $D_5$ is multiplied by $x^2$+x(i.e., (x+1) shifted rightward by one bit) output from the randomizer 1000 (i.e., $D_5$ ($x^2$+x)); and the parity check code $P_1$ can be generated by bit-wise XORing of $D_0$, $D_1x$, $D_2x^2$, $D_3x^3$, $D_4$ (x+1) and $D_5$ ($x^2$+x) to obtain "01000001", as shown in FIG. 10F.

In some implementations, more than two parity check codes can be generated that are used to recover and correct more than two of the data stored in the memory device 110 that are affected to be incorrect. For example, k parity check codes can be generated, in order to recover k of the stored data that are affected to be incorrect. Regarding the generation of the kth parity check code $P_{k-1}$, initially the data Do is multiplied by 1; after k−1 clocks, the data $D_1$ is multiplied by $x^{k-1}$ output from the randomizer 1000 (i.e., $D_1x^{k-1}$); after 2 (k−1) clocks, the data $D_2$ is multiplied by $x^{2(k-1)}$ (module q(x)) (i.e., $D_2x^{2(k-1)}$); after 3(k−1) clocks, the data $D_3$ is multiplied by $x^{3(k-1)}$ (module q(x)) (i.e., $D_3x^{3(k-1)}$); after 4(k−1) clocks, the data $D_4$ is multiplied by $x^4$ (k−1) (module q(x)) (i.e., $D_{4x}^{4(k-1)}$); after 5 (k−1) clocks, the data $D_5$ is multiplied by $x^{5(k-1)}$ (module q(x)) (i.e., $D_5x^{5(k-1)}$); and the parity check code $P_{k-1}$ can be generated by bit-wise XOR of $D_0$, $D_1x^{k-1}$, $D_2x^{2(k-1)}$, $D_3x^{3(k-1)}$, $D_{4x}^{4(k-1)}$ and $D_5x^{5(k-1)}$.

FIGS. 11A-11H illustrate decoding (or recovering) some of the data $D_0$-$D_5$ that are affected to be incorrect by using the randomizer 1000 according to some implementations of the present disclosure. As shown in FIG. 11A, the data $D_1$ and $D_4$ (indicated by grey background) are affected to be incorrect. Accordingly, $D_1xx$ and $D_4xx^4$ (indicated by grey background) can be used to recover the incorrect data $D_1$ and $D_4$, as shown in FIG. 11B, by referring to FIG. 9B. As shown in FIGS. 11C and 11C, $D_1+D_4$ (bit-wise XOR of $D_1$ and $D_4$)="01000011", and $D_1xx+D_4xx^4$ (bit-wise XOR of $D_1xx$ and $D_4xx^4$)="01010011". FIG. 11E shows simultaneous equations of the data $D_1$ and $D_4$ that is obtained by multiplying a reduced polynomial matrix that includes the second and fifth columns of the first and second rows of a polynomial (Vandermonde) matrix with a data matrix (or vector) of data $D_1$ and $D_4$. FIG. 11F shows the data $D_1$ and $D_4$ that are obtained by multiplying the inverse matrix of the reduced polynomial matrix with a matrix of $D_1+D_4$ and $D_1xx+D_4xx^4$. In some implementations, the data $D_1$ and $D_4$ can be obtained by using the randomizer 1000. For example, bit-wise XOR of the parity check code $P_0$ and the data $D_0$, $D_2$, $D_3$ and $D_5$ can be multiplied by the output of the randomizer 1000 after four clocks since a randomized seed is input to the randomizer 1000 (as indicated by a dashed line shown in FIG. 10E) to generate $(D_1+D_4)$ $xx^4$; likewise, bit-wise XOR of the parity check code $P_1$ and the data $D_0$, $D_2xx^2$ (the data $D_2$ is multiplied by the output of the randomizer 1000 after two clocks since a randomizer seed is input to the randomizer 1000), $D_3xx^3$ and $D^5xx^5$ to obtain $D_1xx+D_4xx^4$; and then bit-wise XOR of $(D_1+D_4)$ $xx^4$ and $D_1xx+D_4xx^4$ to obtain $D_1$, as shown in FIG. 11G. The data $D_4$ can also be obtained by using the randomizer 1000 in a similar fashion, as shown in FIG. 11H.

Aspects of the present disclosure provide a memory system, e.g., the memory system 100 shown in FIG. 1. In one implementation, the memory system can include a memory device, e.g., the memory device 110 shown in FIG. 1, that is configured to store data, e.g., the data $D_0$-$D_5$, and one or more parity check codes, e.g., the parity check codes $P_0$ and $P_1$. In another implementation, the memory system can further include memory controller, e.g., the memory controller 140 shown in FIG. 1. For example, the memory controller 140 can include a randomizer, e.g., the randomizers 500 and 1000, that is configured to generate a sequence of pseudo-randomized numbers using a randomizer seed in response to a clock signal according to a predetermined rule. As another example, the memory controller can further include a codec, e.g., the codec included in the correction module 443 shown in FIG. 4, that is coupled to the memory device and the randomizer, the codec configured to generate the one or more parity check codes according to the pseudo-randomized numbers. In one implementation, the parity check codes can be written to the memory device when a write operation is performed and be used to recover at least one of the data stored in the memory device when a read operation is performed and the at least one of the data is incorrect. In another implementation, the randomizer seed can be selected based on the data and the pseudo-randomized numbers. For example, the randomizer seed can be selected from the sum of the data and the pseudo-randomized numbers.

In one implementation, the codec can be configured to generate the parity check codes by multiplying the pseudo-randomized numbers and the data and performing a bit-wise logic operation of multiplications of the pseudo-randomized numbers and the data. In another implementation, the codec can be configured to generate a number of the parity check codes, and the randomizer can be configured to generate the sequence of pseudo-randomized numbers using the randomizer seed in response to every the number of clocks of the clock signal according to the predetermined rule.

Figure 12:
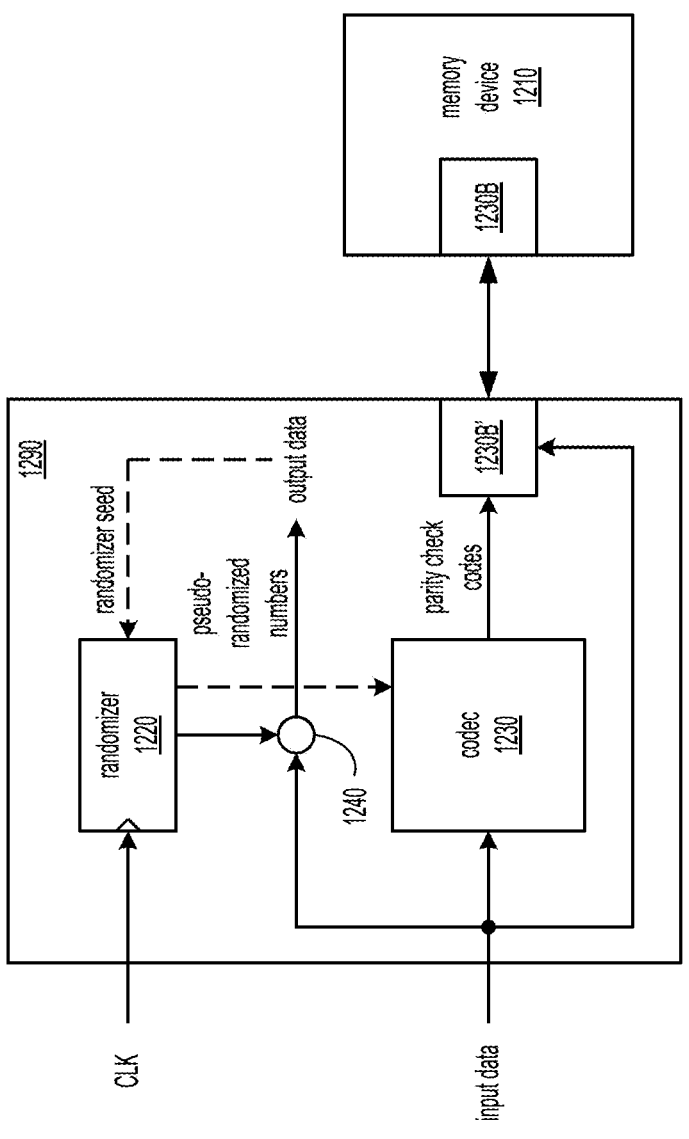
FIG. 12 is a functional block diagram of an example of a memory system according to some implementations of the present disclosure.

FIG. 12 is a functional block diagram of an example of a memory system 1200 according to some implementations of the present disclosure. The memory system 120 can include a memory device 1210, e.g., the memory devices 110 and 410, that is configured to store data (e.g., input data) and one or more parity check codes. In one implementation, the memory device 1210 may be implemented with a volatile memory such as a DRAM or an SRAM. The memory system 1200 can further include a randomizer 1220 that is configured to generate a sequence of pseudo-randomized numbers using a randomizer seed in response to a clock signal CLK according to a predetermined rule. In one implementation, the randomizer 1220 can include an LFSR that may be specified by a primitive polynomial. The memory system 1200 can further include a codec 1230, e.g., the codec included in the correction module 443 shown in FIG. 4, that is coupled to the memory device 1210 and the randomizer 1220 and configured to generate one or more parity check codes according to the pseudo-randomized numbers and data (e.g., the input data). In one implementation, the codec 1230 can be configured to generate a number of the parity check codes, and the randomizer is configured to generate the sequence of pseudo-randomized numbers using the randomizer seed in response to every the number of clocks of the clock signal according to the predetermined rule. For example, the codec 1230 can generate one of the parity check codes (e.g., the parity check code $P_0$), and the randomizer 1220 can be configured to generate the sequence of pseudo-randomized numbers using the randomizer seed in response to every one clock of the clock signal CLK. As another example, the codec 1230 can generate two of the parity check codes (e.g., the parity check codes $P_0$ and $P_1$), and the randomizer 1220 can be configured to generate the sequence of pseudo-randomized numbers using the randomizer seed in response to every two clocks of the clock signal CLK. In one implementation, the codec 1230 can be configured to generate the parity check codes by multiplying the pseudo-randomized numbers and the data and performing a bit-wise logic operation of multiplications of the pseudo-randomized numbers and the data. For example, the parity check code $P_0$ can be generated by bit-wise XOR of the input data, as shown in FIG. 10C. As another example, the parity check code $P_1$ can be generated by multiplying the pseudo-randomized numbers and the input data and performing a bit-wise logic operation of multiplications of the pseudo-randomized numbers and the data, as shown in FIG. 9A. In some implementations, the randomizer 1220 and the codec 1230 can be included in a memory controller 1290, e.g., the memory controller 440 shown in FIG. 4.

In one implementation, the data and the parity check codes can be written to the memory device 1210 via memory interfaces 1230B and 1230B' when a write operation is performed and be used to recover at least one of the data stored in the memory device 1210 when a read operation is performed and the at least one of the data is incorrect. In some implementations, the LSFR included in the randomizer 1220 can include a first number of cascaded shift registers, the input data can include a second number of pages, the one or more parity check codes can include a third number of parity check codes, and two to a power of the first number is greater than multiplication of the second number minus one and the third number minus one. For example, if a NAND memory is provided that has 4 dies each having 4 planes each having 128 layers (6 strings) with two neighboring strings coupled to different word lines (WL) as a group, each group having 128 (WL)×2 (string)×4 (plane)×4 (die)=4096 ($2^{12}$) elements (page), SLCs being 3 in groups, TLCs being 9 in groups, and four errors are to be corrected, $n=4096$, $k=4$, $(n-1)\times(k-1)=4095x^3<2^{16}-1$, and $GF(2^{16})$ can be selected.

In one implementation, the memory system 1200 can further include an operator 1240 that operates the input data with the pseudo-randomized numbers, and the randomizer seed can be selected based on the input data and the pseudo-randomized numbers. For example, the operator 1240 can include an adder that is configured to add the input data with the pseudo-randomized numbers to generate output data, and randomizer seed can be selected from the output data.

Aspects of the present disclosure also provide a method for controlling a memory system. For example, the method can include generating, by using a randomizer, a sequence of pseudo-randomized numbers using a randomizer seed in response to a clock signal according to a predetermined rule, receiving data to be stored in a memory device, generating one or more parity check codes according to the pseudo-randomized numbers and the data and writing the parity check codes and the data to the memory device when a write operation is performed, and recovering at least one of the data stored in the memory device using the one or more parity check codes when a read operation is performed and the at least one of the data stored in the memory device is incorrect.

The foregoing outlines features of several implementations so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the implementations introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory system, comprising:
a memory device configured to store data and one or more parity check codes;
a randomizer configured to generate a sequence of pseudo-randomized numbers using a randomizer seed in response to a clock signal according to a predetermined rule; and
a codec coupled to the memory device and the randomizer, the codec configured to generate the one or more parity check codes according to the pseudo-randomized numbers and the data, the parity check codes to be written to the memory device when a write operation is performed and to be used to recover at least one of the data stored in the memory device when a read operation is performed and the at least one of the data is incorrect,
wherein
the codec is configured to generate the parity check codes by multiplying the pseudo-randomized numbers and the data and performing a bit-wise logic operation of multiplications of the pseudo-randomized numbers and the data,
the randomizer seed is selected based on the data and the pseudo-randomized numbers, or
the randomizer includes a linear feedback shift register (LFSR), the LFSR is specified by a primitive polynomial, the LSFR includes a first number of cascaded shift registers, the data include a second number of pages, the one or more parity check codes include a third number of parity check codes, and two to a power of the first number is greater than multiplication of the second number minus one and the third number minus one.

2. The memory system of claim 1, wherein the codec is configured to generate the parity check codes by multiplying the pseudo-randomized numbers and the data and performing the bit-wise logic operation of multiplications of the pseudo-randomized numbers and the data.

3. The memory system of claim 1, wherein the codec is configured to generate a number of the parity check codes, and the randomizer is configured to generate the sequence of pseudo-randomized numbers using the randomizer seed in response to every the number of clocks of the clock signal according to the predetermined rule.

4. The memory system of claim 1, wherein the randomizer seed is selected based on the data and the pseudo-randomized numbers.

5. The memory system of claim 1, wherein the randomizer includes the linear feedback shift register (LFSR).

6. The memory system of claim 5, wherein the LFSR is specified by the primitive polynomial.

7. The memory system of claim 6, wherein the LSFR includes the first number of cascaded shift registers, the data include the second number of pages, the one or more parity check codes include the third number of parity check codes, and two to the power of the first number is greater than multiplication of the second number minus one and the third number minus one.

8. A method, comprising:
generating, by using a randomizer, a sequence of pseudo-randomized numbers using a randomizer seed in response to a clock signal according to a predetermined rule;
receiving data to be stored in a memory device;
generating one or more parity check codes according to the pseudo-randomized numbers and the data and writing the parity check codes and the data to the memory device when a write operation is performed; and
recovering at least one of the data stored in the memory device using the one or more parity check codes when a read operation is performed and the at least one of the data stored in the memory device is incorrect,
wherein
the parity check codes are generated by multiplying the pseudo-randomized numbers and the data and performing a bit-wise logic operation of multiplications of the pseudo-randomized numbers and the data,
the randomizer seed is selected based on the data and the pseudo-randomized numbers, or
the randomizer includes a linear feedback shift register (LFSR), the LFSR is specified by a primitive polynomial, the LSFR includes a first number of cascaded shift registers, the data include a second number of pages, the one or more parity check codes include a third number of parity check codes, and two to a power of the first number is greater than multiplication of the second number minus one and the third number minus one.

9. The method of claim 8, wherein the parity check codes are generated by multiplying the pseudo-randomized numbers and the data and performing the bit-wise logic operation of multiplications of the pseudo-randomized numbers and the data.

10. The method of claim 8, wherein a number of the parity check codes are generated, and the sequence of pseudo-randomized numbers are generated by using the randomizer seed in response to every the number of clocks of the clock signal according to the predetermined rule.

11. The method of claim 8, wherein the randomizer seed is selected based on the data and the pseudo-randomized numbers.

12. The method of claim 8, wherein the randomizer includes the linear feedback shift register (LFSR).

13. The method of claim 12, wherein the LFSR is specified by the primitive polynomial.

14. The method of claim 13, wherein the LSFR includes the first number of cascaded shift registers, the data include the second number of pages, the one or more parity check codes include the third number of parity check codes, and two to the power of the first number is greater than multiplication of the second number minus one and the third number minus one.

15. A memory controller, comprising:

a randomizer configured to generate a sequence of pseudo-randomized numbers using a randomizer seed in response to a clock signal according to a predetermined rule; and a codec coupled to the randomizer, the codec configured to generate one or more parity check codes according to the pseudo-randomized numbers and data to be stored in a memory device, the parity check codes to be written to the memory device when a write operation is performed and to be used to recover at least one of the data stored in the memory device when a read operation is performed and the at least one of the data is incorrect, wherein the codec is configured to generate the panty check codes by multiplying the pseudo-randomized numbers and the data and performing a bit-wise logic operation of multiplications of the pseudo-randomized numbers and the data, the randomizer seed is selected based on the data and the pseudo-randomized numbers, or the randomizer includes a linear feedback shift register (LFSR), the LFSR is specified by a primitive polynomial and includes a first number of cascaded shift registers, the data include a second number of pages, the one or more parity check codes include a third number of parity check codes, and two to a power of the first number is greater than multiplication of the second number minus one and the third number minus one.

16. The memory controller of claim 15, wherein the codec is configured to generate the parity check codes by multiplying the pseudo-randomized numbers and the data and performing the bit-wise logic operation of multiplications of the pseudo-randomized numbers and the data.

17. The memory controller of claim 15, wherein the codec is configured to generate a number of the panty check codes, and the randomizer is configured to generate the sequence of pseudo-randomized numbers using the randomizer seed in response to every the number of clocks of the clock signal according to the predetermined rule.

18. The memory controller of claim 15, wherein the randomizer seed is selected based on the data and the pseudo-randomized numbers.

19. The memory controller of claim 15, wherein the randomizer includes the linear feedback shift register (LFSR).

20. The memory controller of claim 19, wherein the LFSR is specified by the primitive polynomial and includes the first number of cascaded shift registers, the data include the second number of pages, the one or more parity check codes include the third number of parity check codes, and two to the power of the first number is greater than multiplication of the second number minus one and the third number minus one.

* * * * *